United States Patent [19]

Montesanto

[11] Patent Number: 4,500,170

[45] Date of Patent: Feb. 19, 1985

[54] GRAVITY AND TEMPERATURE COMPENSATING REFLECTOR SUPPORT ACTUATOR

[75] Inventor: Ernest C. Montesanto, San Jose, Calif.

[73] Assignee: Ford Aerospace & Communications Corporation, Detroit, Mich.

[21] Appl. No.: 388,290

[22] Filed: Jun. 14, 1982

[51] Int. Cl.³ .............................................. G02B 7/18
[52] U.S. Cl. ................................................... 350/611
[58] Field of Search ............... 350/310, 295, 289, 292, 350/503, 504, 293

[56] References Cited

U.S. PATENT DOCUMENTS

| | | |
|---|---|---|
| 3,121,605 | 2/1964 | Nunn ................................. 350/310 |
| 3,601,476 | 8/1971 | MacKenzie . |
| 3,603,671 | 8/1971 | Brown . |
| 3,620,606 | 11/1971 | Tschunko . |
| 3,694,059 | 9/1972 | Shakespeare . |
| 4,060,315 | 11/1977 | Heinz . |
| 4,226,506 | 10/1980 | Auger . |
| 4,239,344 | 12/1980 | Wildenrotter . |
| 4,295,710 | 10/1981 | Heinz ................................. 350/295 |

OTHER PUBLICATIONS

Henderson & Gunn, "System Performance . . . Ball Screw Actuators", S.P.I.E., vol. 179, 1979, pp. 51-60.
NASA Tech. Brief, "Mount Enables Precision Adjustment of Optical-Instrumentation Mirror", May, 1966.
Gabor, "Displacement Sensors and Actuators Needed to Control a Segmented Primary Mirror", Optical and Infrared Telescopes for the 1990's, Kitt Peak National Observatory Conference Proceedings, vol. 1, May 1980, pp. 587-596 and 605-607.
Meinel and Meinel, "7-Meter Texas Monolith Telescope (TMT)", Feb. 1980, section entitled Radial Support.

Primary Examiner—John K. Corbin
Assistant Examiner—Lynn Vandenburgh Kent
Attorney, Agent, or Firm—Edward J. Radlo; Robert D. Sanborn

[57] ABSTRACT

An actuator (1) for mechanically supporting a structure such as an optical or radio telescope reflector (3). The actuator (1) is free to precess about a pivot point (C) which is fixed with respect to the supporting cell structure (9). This can be accomplished by gimballing the actuator (1) using vertical (13) and horizontal (17) trunnions. This gimballing arrangement permits radial and axial excursions of each actuator ball (29) to compensate for gravity vector variations as the reflector (3) is moved to point towards its target, and to compensate for thermal expansion variations between the reflector (3) and cell (9). Fine axial position adjustments are accomplished by a rotating nut (43) or a rotating screw (63) configuration in conjunction with a stepper motor (47 or 67). Motor (47 or 67) can receive its commands from a real-time closed loop system sensitive to axial position or axial load. A counterweight (57) appended to each actuator (1) balances the radial gravity loads among each of many actuators (1) and hard points (5) used to support the reflector (3). This system produces almost total decoupling of axial loads from radial loads, enabling the reflector (3) to "float" radially, permitting a thinner lighter reflector (3) which adjusts to the deflections of a lighter support cell (9) rather than being supported rigidly in a very stiff heavy cell (9).

12 Claims, 5 Drawing Figures

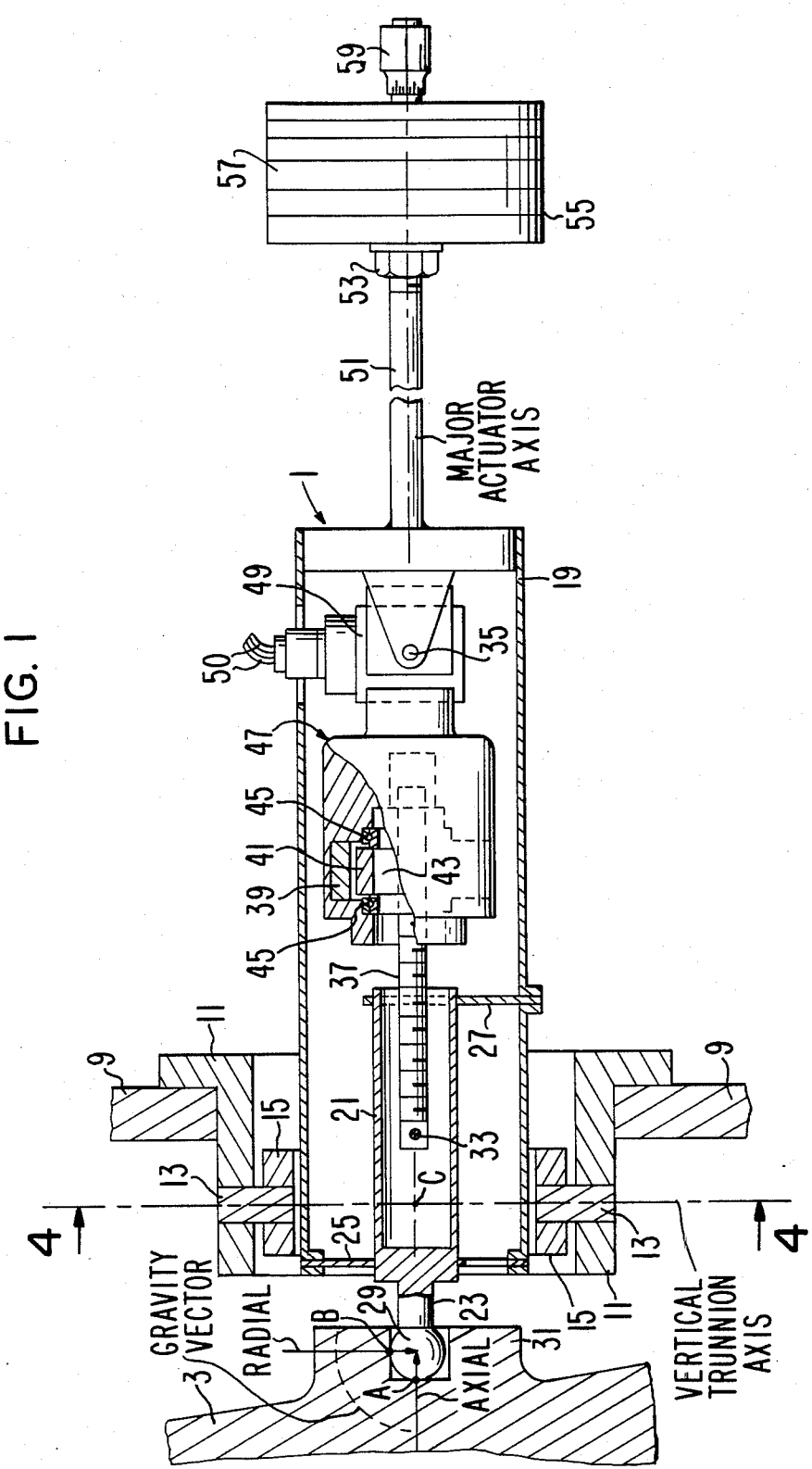

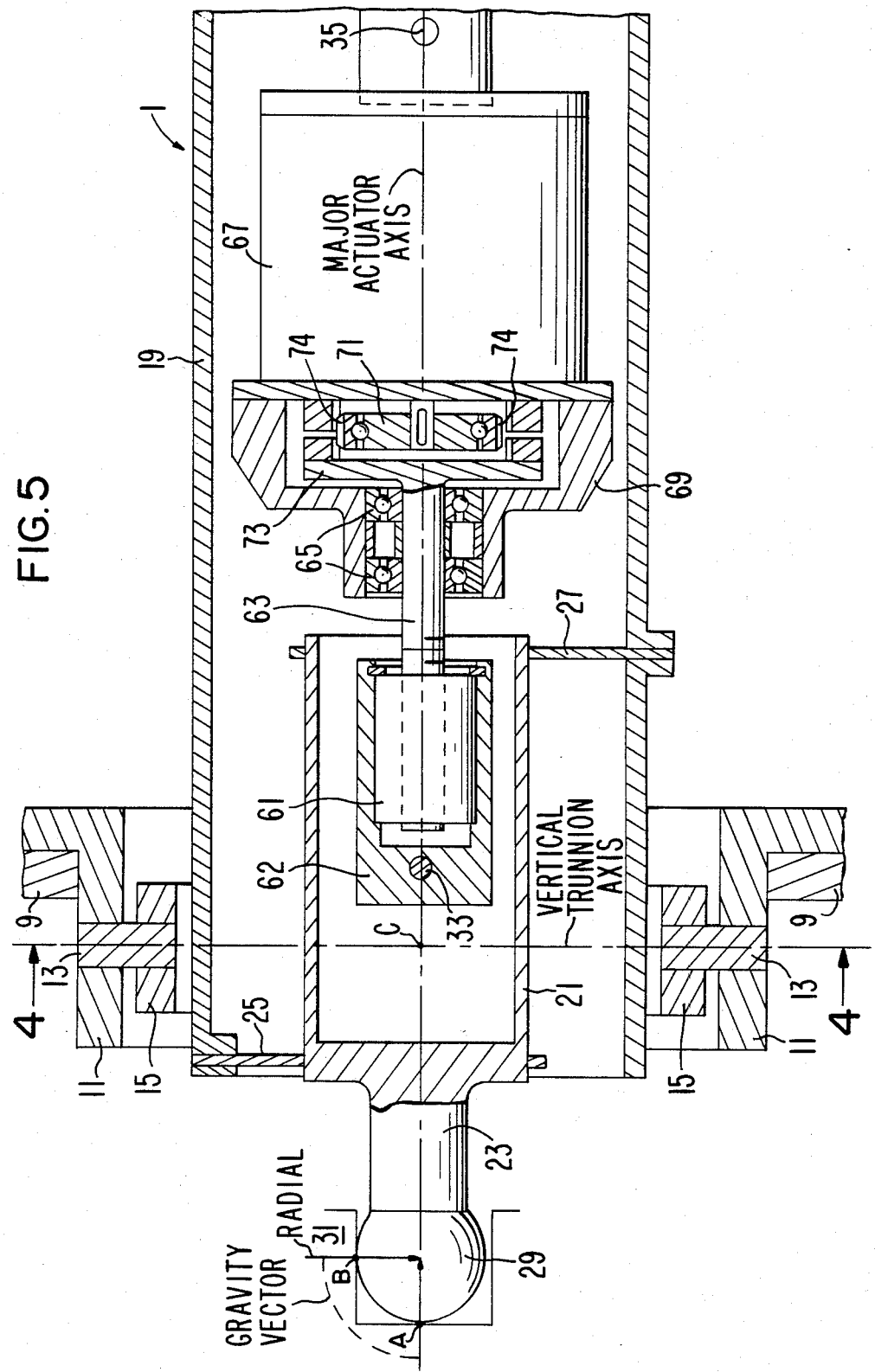

GRAVITY AND TEMPERATURE COMPENSATING REFLECTOR SUPPORT ACTUATOR

DESCRIPTION

1. Technical Field

This invention pertains to the field of mechanical actuators for supporting large surfaces such as paraboloidal optical or radio telescope reflectors.

2. Background Art

A prior art search uncovered the following references:

U.S. Pat. No. 4,226,506 differs from the present invention in that: it limits discussion to a set of supports each of which acts upon a single reflective panel of a larger reflector, not one continuous reflector as with the actuators of the present invention; it does not disclose uniform load sharing in the plane of the panel amongst all the support rods, whereas the present invention equally balances radial loads throughout the reflector enabling the reflector to "float" as it is turned; it does not compensate for distortions in the panel caused by gravity or thermal expansion; structurally, it does not have a fixed pivot point; each support in the patent is designed to be set once, whereas the present actuators are applied where real-time continuous axial adjustment is required.

U.S. Pat. No. 3,620,606 differs from the present invention in that: it is a mirror support system having gross cross-coupling between the axial and radial loads, whereas the present invention has practically no such cross-coupling; it makes no attempt to balance radial loads on each actuator; it does not have a fixed pivot point.

U.S. Pat. No. 4,060,315 is a mirror mount which differs from the actuator of the present invention in that: it is not designed as one of many supports of a single large mirror; it is not capable of balancing radial loads; in fact, V-shaped flexures 35 constrain radial motion, whereas the actuators described herein translate as required to compensate for shifting gravity loads and thermal expansion; it does not have a single fixed pivot point.

U.S. Pat. No. 4,239,344 discloses a solar collector reflector support which differs from the actuator of the present invention in that it does not provide continual fine position adjustment, nor does it equalize gravity loads throughout the reflector; it does not balance radial loads at each support.

U.S. Pat. No. 3,601,476 is a tilt adjustment which is not suitable for use in an array to support a large monolithic mirror or reflector panel, does not provide fine axial adjustment, and does not provide radial balancing.

U.S. Pat. No. 3,694,059 is not an active device designed to continually correct a reflector to an ideal shape as in the present invention. It does not perform radial balancing or cope with thermal expansion.

U.S. Pat. No. 3,603,671 corrects for aberrations in a mirror in the axial direction only and does not provide balancing of radial loads.

Gabor, "Displacement Sensors and Actuators Needed to Control a Segmented Primary Mirror", *Optical and Infrared Telescopes for the 1990's*, Kitt Peak National Observatory Conference Proceedings, Vol. I, May 1980, pages 587-596 and 605-607, addresses the problem of active control for a large mirror comprised of many smaller mirrors, not a monolithic mirror as in the present invention. it discusses high resolution axial movement but not simultaneous radial load balancing as in the present invention.

Meinel and Meinel, "7-Meter Texas Monolith Telescope (TMT)", February 1980, section entitled "Radial Support", shows a counterweight and suggests the desirability of maintaining uniform radial forces in supporting a monolithic telescope mirror, but does not show how to design a suspension to accomplish this, nor does it include within the suggested device means for actively changing the axial position. It teaches away from the present invention in that it proposes to keep the axial excursions to small levels by making the mirror support cell deflection as low as practicable. This is in direct contrast to the present invention, which saves weight and cost of the cell by allowing it to be somewhat flexible, while correcting for cell deflection by providing for axial corrections simultaneously with maintaining uniform radial loads.

DISCLOSURE OF INVENTION

The invention consists of an actuator (1) which is affixed to the reflector support structure (9) of an optical or radio telescope, for supporting its reflector (3) both axially and radially, thus smoothing out aberrations in the reflector (3) caused by the shifting gravity vector as the reflector (3) is rotated through its normal excursion as well as aberrations caused by displacements due to differential thermal expansion between the reflector (3) and its supporting cell structure (9). A set of many of these actuators (1) is used to support a large reflector (3). Each actuator (1) almost totally decouples the axial and radial components of the gravity vector, enabling the reflector (3) to "float" radially, permitting the use of a thinner lighter reflector (3) which adjusts to the deflections of a lighter support cell (9) rather than being supported rigidly in a very stiff heavy cell (9). As a consequence, a cost savings is realized for the reflector (3), cell (9), and other parts of the telescope.

The radial gravity loads are balanced by a counterweight (57) appended to each actuator (1). Axial loads are resisted along the major actuator axis. Fine axial positioning is achieved by a traveling nut (43) or a traveling screw (63), actuated by a motor (47 or 67, respectively) in response to real time signaling information which can be proportional to deviation of the axial position of the reflector (3) or deviations in the axial load. the actuator (1) is gimballed to freely precess about a fixed pivot point (C) located at the intersection of the two trunnion (13 and 17) axes, permitting the necessary radial excursions between the corresponding portion of the reflector (3) and supporting cell structure (9).

BRIEF DESCRIPTION OF THE DRAWINGS

These and other more detailed and specific objects and features of the present invention are more fully disclosed in the following specification, reference being had to the accompanying drawings, in which:

FIG. 1 is a cross-sectional side view of one embodiment of an actuator (1) built according to the teachings of the present invention;

FIG. 5 is a cross-sectional side view of an alternative embodiment of actuator (1).

BEST MODE FOR CARRYING OUT THE INVENTION

Cell 9 is a supporting structure for reflector 3 and is fabricated of steel, graphite epoxy, or some other suitable material. It is activated by means of an elevation-/azimuth mount or other mount such that the force of gravity acting on reflector 3 always lies parallel to the plane depicted in FIGS. 1 and 5.

Since the total elevational range of reflector 3 is from a horizontal to a vertical position, e.g., 90°, the gravity vector falls within the northwest quadrant only as shown in FIGS. 1 and 5. It can be considered to be passing through the midpoint of ball 29 of each actuator 1 and can be broken up into two orthogonal vectors: an axial load vector which points from left to right along the major actuator axis, acting on ball 29 through point A of reflector attach means 31 (which has a cylindrical cavity), and a radial load vector which points from top to bottom, parallel to the vertical trunnion axis of actuator 1, and passes through point B of reflector attach means 31.

Figure 3:
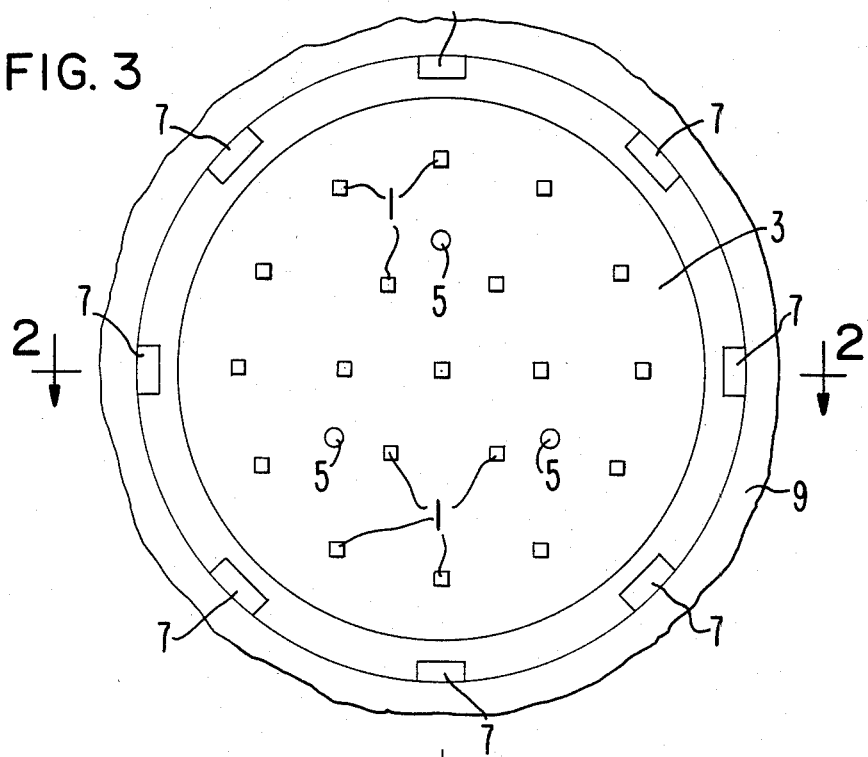
FIG. 3 is a view of the convex side of a reflector (3) supported by many actuators (1) plus three hard points (5)

Although the actuators 1 of this invention can be used for supporting many types of reflectors and even other structures, the primary utilization contemplated is in supporting a large, thin, high aspect ratio optical or radio telescope reflector 3. FIG. 3 shows that many of these actuators 1, preferably equally spaced throughout the side of reflector 3, are required to support a large reflector 3. The number and location of actuators 1 is a function of the level to which reflector 3 front side aberrations must be reduced.

In addition to the support given by the actuators 1, reflector 3 is typically supported by at least three equally spaced hard points 5, which form a rigid interconnection between reflector 3 and cell 9 so as to define the position of reflector 3 radially and axially. Part of cell 9 extends in the area beyond the periphery of reflector 3 as shown in FIG. 3, forming an annular open space between reflector 3 and this portion of cell 9. Protruding from the inside of that portion of cell 9 defining this open ring are several safety constraints 7, e.g., springs or shock absorbers, which prevent gross dislocations in reflector 3 due to seismic or other disturbances while allowing normal thermal expansion of reflector 3.

Figure 2:
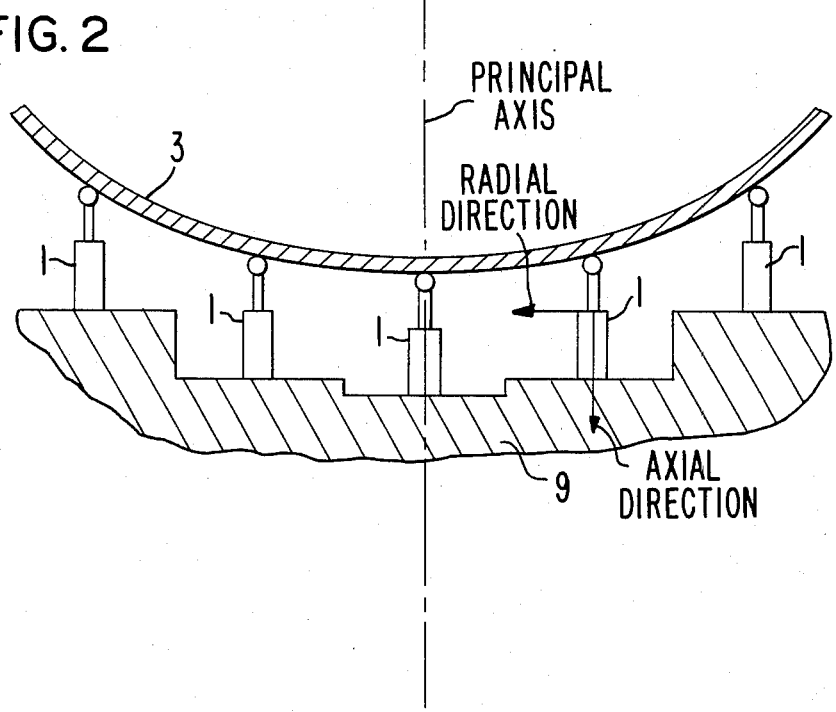
FIG. 2 is a cross-sectional schematic side view, taken along lines 2—2 of FIG. 3, of a reflector (3) supported by several actuators (1) of the present invention.

FIG. 2 shows that all of the actuators 1 are preferably (although not necessarily) aligned parallel with the principal axis of reflector 3. This defines the axial direction. The radial direction on each actuator 1 is defined as that orthogonal to the axial direction.

Each actuator 1 provides an axially rigid but adjustable and a radially compliant connection support between cell 9 and reflector 3. Such a support system "floats" reflector 3 in the plane perpendicular to the reflector's principal axis. The axial support system and radial support system are virtually independent of each other because of the unique construction of actuator 1. Axial movement at each actuator 1 necessary to correct the shape of reflector 3 does not significantly change the radial component of support reaction. Conversely, changing radial gravity loads resulting from rotation of reflector 3 as it tracks its target do not impede the system from correcting axially. In other words, there is virtually no cross-coupling between the axial support and the radial support as in other systems.

This decoupling is achieved by constructing actuator 1 so that it is free to precess within certain angular excursions (which typically need to be only a few degrees) around a pivot point C which is fixed with respect to cell 9 but not with respect to reflector 3. Point C is the intersection of the orthogonal vertical and horizontal trunnion axes, both of which are orthogonal to the major actuator axis, i.e., the longitudinal axis of actuator 1.

Figure 4:
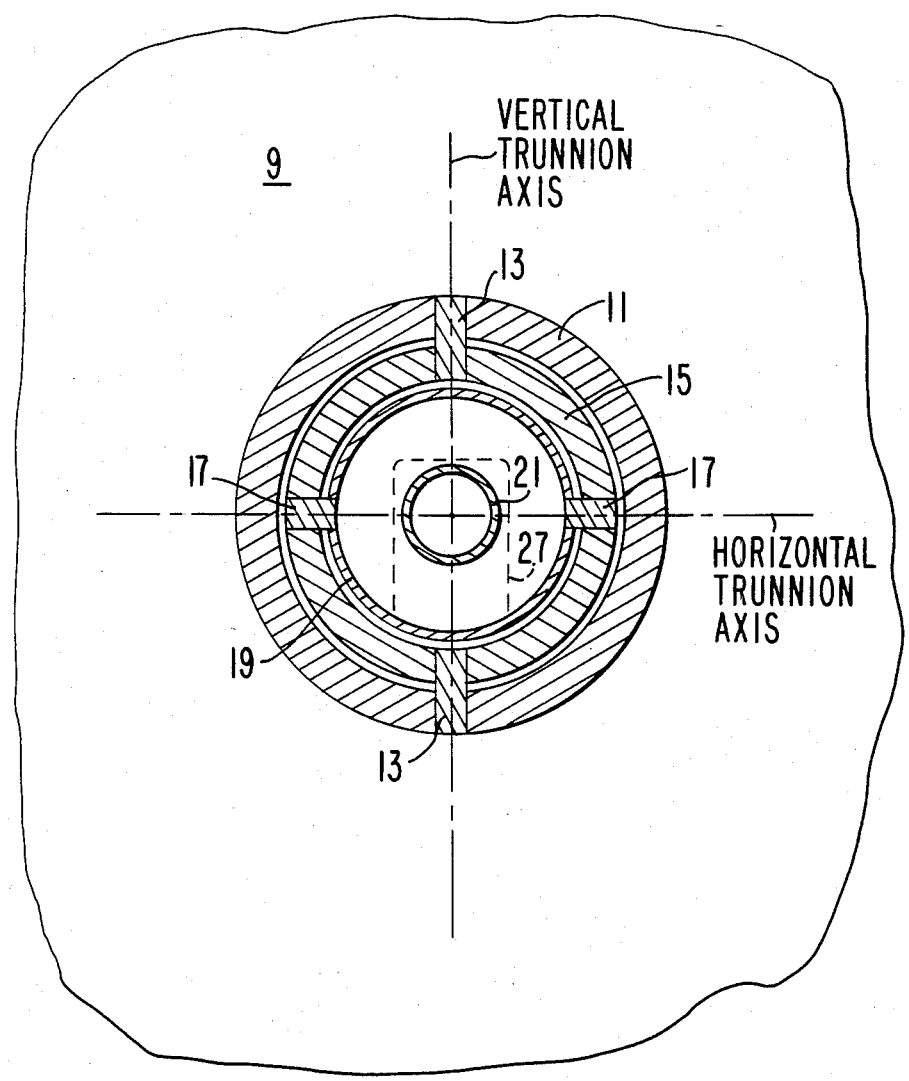
FIG. 4 is a cross-sectional end view taken along view lines 4—4 of FIG. 1, or alternatively, of FIG. 5, of actuator (1) of the present invention.

This precession can be accommodated by gimballing actuator 1 as illustrated in FIGS. 1, 4, and 5. An outer housing 11, which can be a cylindrical sleeve, is fixedly attached to cell 9. Suspended within outer housing 11 by means of vertical trunnions 13 is an inner housing 15, which can also be a cylindrical sleeve. Vertical trunnions 13 permit actuator 1 to move horizontally. Suspended within inner housing 15 by means of horizontal trunnions 17 is elongated hollow outer support tube 19 of actuator 1. Horizontal trunnions 17 permit vertical excursions of actuator 1.

Vertical trunnions 13 and horizontal trunnions 17 are flexural pivots or other devices which minimize backlash, friction and hysteresis. Flexural pivots are good choices because each pivot is axially and radially stiff but moment compliant about its own axis.

This gimballing arrangement has the effect of a universal joint, allowing outer support tube 19 to precess throughout several degrees of angular excursion in any direction about point C.

Elongated hollow inner support tube 21 is suspended within outer support tube 19 by means of forward leaf spring 25 and aft leaf spring 27. Since the gravity vector lies entirely in a plane parallel to the page of FIGS. 1 and 5, which plane includes the major actuator axis, leaf springs 25 and 27 are also centered around this plane, on opposite (upper and lower) sides of inner tube 21. This arrangement provides radial stiffness, and axial compliance.

Precise axial adjustments of actuator 1 are, for the FIG. 1 embodiment, accomplished by imparting rotation to nut 43, causing it to travel axially along threaded screw 37, which can be of the machine type or of the ball type depending upon the amount of friction the system will tolerate. The rotation of nut 43 can be accomplished by precision motor 47, typically a stepper motor for reasons of accuracy and repeatability. Since nut 43 is fixedly attached to rotating armature 41, which rotates within stator 39 but is axially constrained, and stator 39 is axially fixed with respect to cell 9, this rotation of nut 43 causes screw 37 and associated items to move axially with respect to cell 9. Specifically, screw 37 is axially constrained by pin 33 within inner support tube 21 which is rigidly connected via rod 23 to ball 29, which engages reflector attach means 31. Therefore, relative movement between screw 37 and rotating nut 43 causes axial movement of reflector 3 with respect to cell 9.

Two bearings 45 constrain nut 43 axially within motor 47 as determined by the position of these bearings 45.

Incremental axial resolution on the order of 10 to 50 nanometers over a 2 to 4 millimeter range is possible with the proper screw 37 lead and motor 47 step size.

Axial load capacity can be made to be practically any required value.

Motor 47 has a fixed axial position within outer support tube 19, e.g., by being fixedly connected to optional load cell 49, which in turn is connected to pivot axis 35 axially fixed within outer support tube 19, enabling load cell 49 (along with motor 47 and screw 37) to pivot about an axis 35 which is parallel to the horizontal trunnion axis.

Similarly, the end of screw 37 nearest to reflector 3 is axially constrained within inner support tube 21, but pivotable about axis 33 parallel to the horizontal trunnion axis. Pivots 33 and 35 minimize bending in the screw 37/nut 43/motor 47 assembly caused by radial displacements of inner support tube 21 caused by axial movement of that support tube by means of the action of leaf springs 25 and 27.

Optional load cell 49 is used when it is desired to take into account forces within actuator 1 in the axial direction in determining the axial position of each actuator 1. Alternatively, axial position can be determined without taking into account axial force, for example, by using laser interferometry to determine aberrations in the reflector 3. In this case, load cell 49 is eliminated, and wires 50, representing control cables from the laser interferometry system which convey to motor 47 (or 67-see FIG. 5) signals proportional to the desired amount of rotation of motor 47 (or 67), can pass through horizontal trunnions 13 or vertical trunnions 17, to make it easier to radially balance actuator 1 by counterweight 57.

Optional load cell 49 receives signals via wires 50 from a control network (not illustrated), which signals are combined with measured axial load signals generated within load cell 49 and conveyed to motor 47 (or 67) to instruct motor 47 (or 67) how much rotation to impart to nut 43 (or eccentric plate 71). The signals on wires 50 can represent desired axial load on that actuator 1, based upon the position of that actuator on the reflector 3 and the elevation angle of the reflector at any given time.

The closed-loop correction systems using either position sensing or force sensing can be performed in real time.

Rod 51 extends axially beyond outer support tube 19 to provide a moment arm for counterweight 57. Counterweight 57 can be adjusted axially along rod 51, which can be threaded in this vicinity, for purposes of balancing, initially about pivot point C, the radial gravity load upon actuator 1. These counterweights 57 enable all the actuators 1 and hard points 5 in the system to equally share the changing radial loads caused by gravity acting upon reflector 3 as it rotates within its 90° elevational range, while permitting the axial position of reflector 3 to vary at all actuator 1 support points in response to the axial control system.

Locking device 53, e.g. a nut, locks counterweight 57 in place axially along rod 51 after the position of counterweight 57 has been established. Control means 59, such as a fine resolution micrometer, imparts precise axial movement of counterweight 57 along rod 51, and enables a visual reading of this position for purposes of calibration and repeatability.

Alternative to an axially adjustable counterweight 57, a counterweight 57 having a variable mass can be employed.

FIG. 5 illustrates an alternative embodiment, differing from FIG. 1 only in that rotating screw 63 is used to impart axial motion, rather than rotating nut 43, and speed reducer 69 is used to give greater axial resolution.

In FIG. 5, nut 61 is rigidly affixed within housing 62 which is axially constrained within inner support tube 21 but pivotable about an axis parallel to the horizontal trunnion axis at pivot 33. Thus, relative axial movement between nut 61 and screw 63 effectuates the desired axial movement of reflector 3 with respect to cell 9.

Speed reducer 69 can be an epicyclic type speed reducer gear set in which eccentric plate 71 is connected to the output of stepper motor 67, and plate 73, parallel to plate 71, is part of screw 63. There is typically a 100 to 1 ratio between the rotational speeds of plates 71 and 73 with motion between the two being imparted by the action of gear teeth 74. Bearings 65 stabilize that portion of screw 63 within speed reducer 69.

Before the support system for a large reflector 3 can be used it must be calibrated, as follows:

1. Place actuator 1 with trunnions 17 in the horizontal position within a test fixture having a simulated cell 9 and a simulated attach means 31 to which weights can be affixed.

2. Roughly adjust the axial length adjustment within actuator 1 to its expected position in the final reflector 3 assembly.

3. Load the test fixture so that the mass on ball 29 from top to bottom through point B is equal to the actual mass that actuator 1 will support when it is in the final reflector 3 assembly. This mass is equal to the mass of reflector 3 divided by the total number of support points (actuators 1 plus hard points 5).

4. Adjust counterweight 57 so that actuator 1 is balanced about pivot point C.

5. Set the dial of micrometer 59 to zero to provide a point of calibration for future reference.

6. Repeat steps 1 through 5 above for all actuators 1.

7. For one of the actuators 1, load varying amounts of mass onto ball 29. For each mass, balance actuator 1 about point C by means of adjusting the axial position of counterweight 57, and for each position note the dial reading on micrometer 59. Thus is obtained a correlation of axial counterweight 57 position as a function of mass applied at point B.

8. Mount all the actuators 1 and all the hard points 5 onto cell 9.

9. Mount the reflector 3 onto the support points 1 and 5 with cell 9 pointing the principal axis of reflector 3 straight up.

10. Perform fine adjustments of the axial position of each of the actuators 1 using, e.g., laser interferometry or the load cell 49 system.

11. Move cell 9 elevationally 90° so that the principal axis of reflector 3 is horizontal.

12. Perform a fine adjustment on each of the counterweights 57 if necessary to compensate for the fact that the axial lengths of the actuators 1 have changed slightly. This is done by equalizing the radial load on each point B with the measured (e.g., by means of strain gages) radial load on each hard point 5, by means of axially repositioning counterweight 57 using the calibration data generated in step 7 above. The fact that the balance point of each actuator 1 may no longer be exactly at point C is of no import.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An actuator for mechanically positioning an object in variable spaced relationship with respect to a support structure, said actuator being coupled to the object at a single location and comprising:

means for effectuating small adjustments in the axial length of the actuator, and thereby in the distance between the object and the structure; and means, substantially independent from said effectuating means, for balancing forces on said single location in a radial direction orthogonal to said axial direction;

wherein the axial adjustments and the radial force balancing are both conveyed to the object at said single location; and said actuator is pivotable throughout small angular excursions about a point fixed with respect to the structure but not with respect to the object.

2. The actuator of claim 1 where said effectuating means comprises a rotating nut constrained axially within the actuator, the nut engaging a screw axially fixed with respect to the object.

3. The actuator of claim 1 wherein the effectuating means comprises a rotating screw constrained axially within the actuator, the screw engaging a nut axially fixed with respect to the object.

4. The actuator of claim 3 wherein the screw is connected to gear reduction means for permitting fine degrees of axial adjustment.

5. the actuator of claim 1 wherein the radial balancing means comprises a counterweight axially movable along a lever arm protruding from an end of the actuator not attached to the object.

6. The actuator of claim 1 wherein the radial balancing means comprises a counterweight of variable mass fixed along a lever arm protruding from an end of the actuator not attached to the object.

7. The apparatus of claim 1 wherein the actuator is pivotably mounted in a gimbal that is fixedly attached to the structure.

8. The actuator of claim 1 further comprising an outer support tube pivotable about said point;

an inner support tube suspended within said outer support tube by means of leaf springs, whereby said inner support tube is radially constrained yet axially movable within said outer support tube; and a pair of pivots within the outer tube for alleviating, during axial displacement, bending moments caused by the action of the leaf springs.

9. A system for supporting a large monolithic reflector, comprising:

a support cell rotatable about two orthogonal axes;

at least three hard points rigidly connecting a surface of the reflector to the cell; and several actuators spaced about said surface, each of which is coupled to said surface at a single location and variably positions a corresponding portion of the reflector with respect to the cell, each actuator providing rigid but movable support in an axial direction parallel to the optical axis of the reflector and compliant support in a radial direction orthogonal to the axial direction, to maintain a smooth shape in the reflector's surface to compensate for shifting gravity loads the cell is rotated and to compensate for differences in thermal expansion between the reflector and cell.

10. the system of claim 9 wherein each actuator is fitted with a counterweight adjustable in axial position for insuring that each actuator and hard point supports an equal share of the radial component of the weight of the reflector.

11. the system of claim 9 wherein each actuator is fitted with a counterweight adjustable in mass for insuring that each actuator and hard point supports an equal share of the radial component of the weight of the reflector.

12. The system of claim 9 wherein each actuator contains means for sensing the axial force applied to the actuator from the reflector, said sensing means coupled to a motor which adjusts the axial length of the actuator and thereby the distance between the reflector and the cell at that location.

* * * * *